H. W. MEYER.
REGULATING VALVE FOR LIQUID WEIGHING MACHINES.
APPLICATION FILED AUG. 15, 1908.
921,428.
Patented May 11, 1909.
3 SHEETS—SHEET 1.
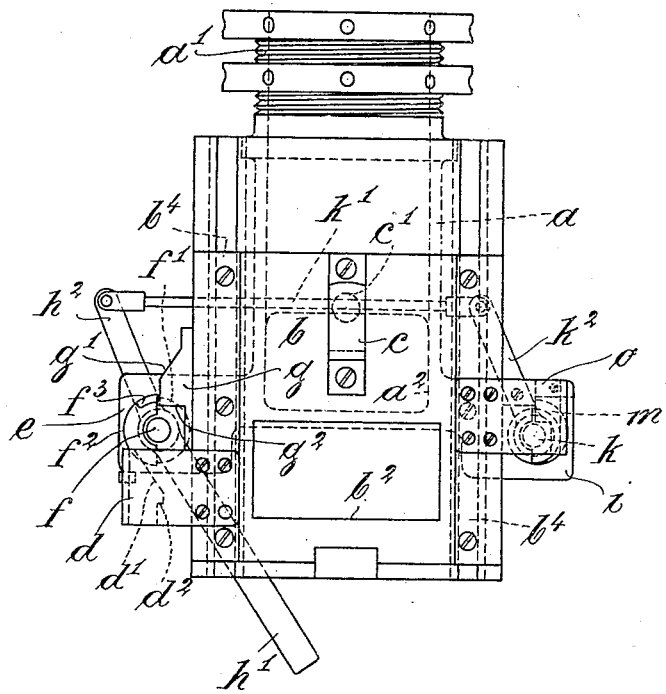
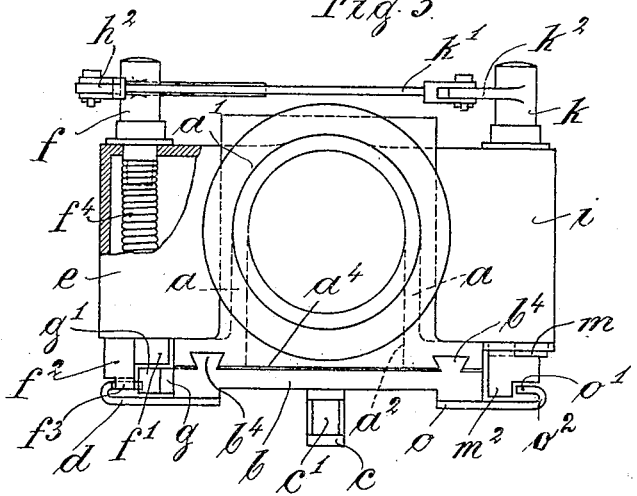

H. W. MEYER.
REGULATING VALVE FOR LIQUID WEIGHING MACHINES.
APPLICATION FILED AUG. 15, 1908.
921,428.
Patented May 11, 1909.
3 SHEETS—SHEET 2.
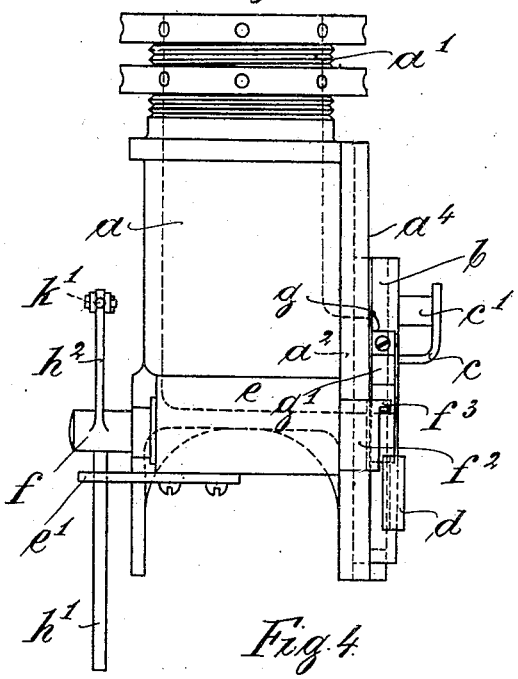
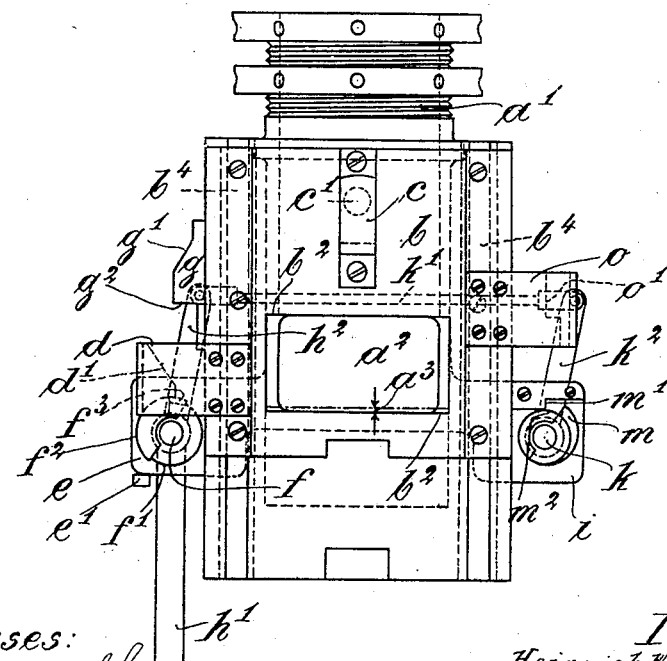
Witnesses:
Flora Grunwald.
Jacob L. Diamond.
Inventor:
Heinrich Wilhelm Meijer
by L. K. Böhm,
Attorney.

H. W. MEYER.
REGULATING VALVE FOR LIQUID WEIGHING MACHINES.
APPLICATION FILED AUG. 15, 1908.
921,428.
Patented May 11, 1909.
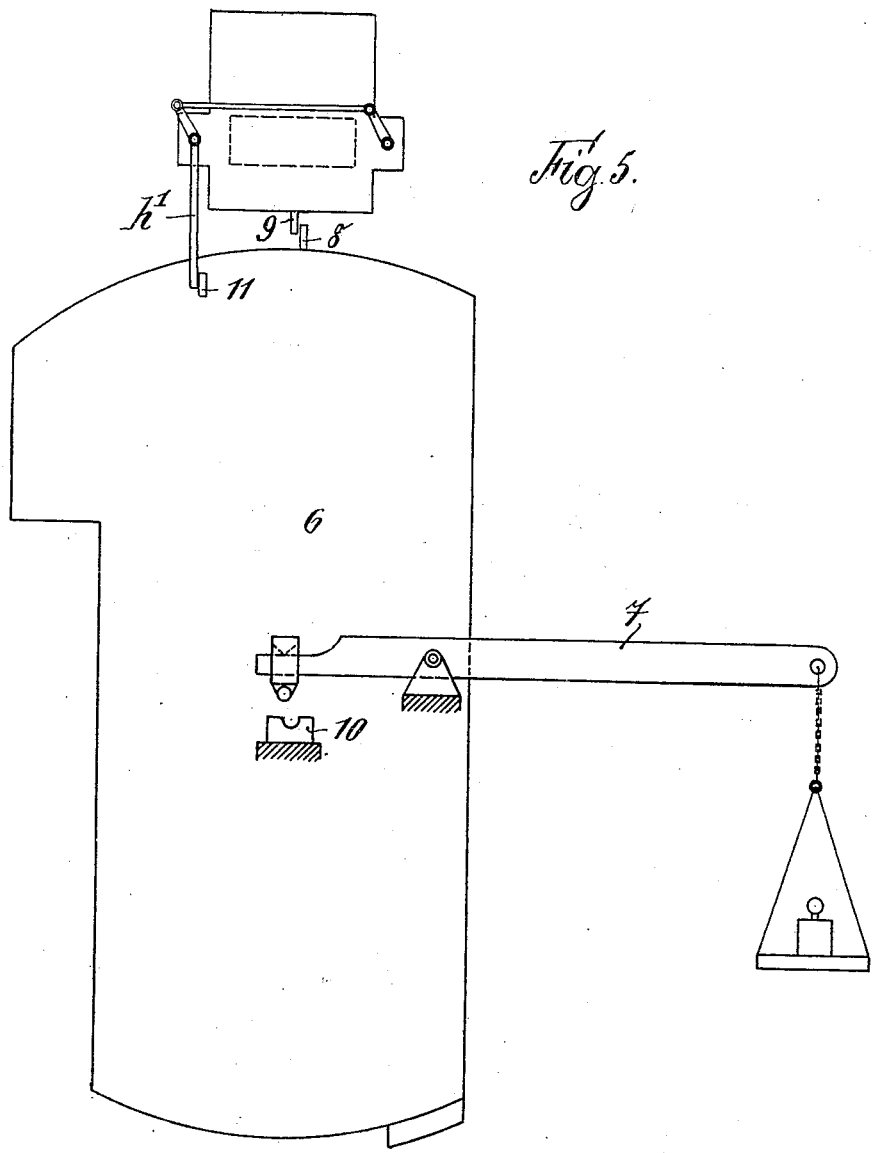

UNITED STATES PATENT OFFICE.

HEINRICH WILHELM MEŸER, OF ZEHLENDORF, NEAR BERLIN, GERMANY.

REGULATING-VALVE FOR LIQUID-WEIGHING MACHINES.

No. 921,428.   Specification of Letters Patent.   Patented May 11, 1909.

Application filed August 15, 1908. Serial No. 443,656.

*To all whom it may concern:*

Be it known that I, HEINRICH WILHELM MEŸER, a subject of the King of Prussia, and resident of 2 Grunewald Allee, Zehlendorf, near Berlin, Kingdom of Prussia, Germany, have invented a new and useful Regulating-Valve for Liquid - Weighing Machines, of which the following is an exact specification.

This invention relates to a valve for regulating the supply of liquid to a weighing receptacle used for instance for weighing sugar juice and the like. Such valves are operated mechanically by the tilting or sinking of the weighing receptacle as the required quantities of liquid are passed into the same. In such regulating valves as hitherto employed the bulk of the liquid has been fed into the receptacle while a rotating slide valve with an opening therein left the outlet of the delivery pipe practically full open. After the main bulk of the liquid had passed through the tilting of the receptacle caused the rotating valve to move so as to bring a small opening therein opposite the outlet of the fluid supply pipe. This small opening was regulated by a separate valve, so that when the remainder of the liquid required to be filled in had been passed in small quantities through said small valve the valve was closed automatically by the sinking action of the holding receptacle. Such a valve is for instance described in patent application Serial No. 384796 filed 20th. of July 07 Heinrich W. Meÿer.

According to the present invention the regulating valve is simplified by arranging the same to govern only one outlet opening, so that an auxiliary valve is dispensed with.

According to the present invention the valve is subjected to a closing force and the valve is held in various positions during supply of the liquid by means of trip gear. The valve itself is preferably arranged in the form of a slide valve which is adapted to close under the action of its own weight and which is stopped in various points of its closing movement by means of trip gear automatically controlled by the tilting and sinking of the holding receptacle for the liquid.

A method of carrying out the invention is illustrated in the accompanying drawings, in which:

Figure 1 is a front view, Fig. 2 is a side elevation, Fig. 3 is a plan, and Fig. 4 is a front view showing the valve in full opened position. Fig. 5 is a diagrammatic view of a weighing machine with a valve according to the present invention.

In carrying the invention into effect the supply pipe $a$ is connected by a screwed part $a'$ to the delivery mains from sugar tanks or the like. The supply pipe $a$ opens on a substantially vertical face $a^4$ and the opening is conveniently in the form of a rectangle $a^2$. On the face $a^4$ there slides a vertically guided slide valve $b$, in which an opening $b^2$ of approximately the same dimensions as the opening $a^2$ is provided. On the front of the slide $b$ there is provided a bracket $c$ carrying the pin or the like $c'$ which is attached to any convenient device for raising the valve into its full opened position shown in Fig. 4. In this full opened position the valve is held by means of a stop $d$ formed out of a plate fixed to the left side of the valve. The stop $d$ is at its outer end bent in the form of a ∪ and the bent round part is cut away so as to form an inclined part $d'$ and an undercut part at its bottom side which leaves a shoulder $d^2$. In the raised position of the slide valve $b$ the shoulder $d^2$ is caught by means of a stop carried by trip gear mounted on the shaft $f$. The shaft $f$ is mounted on fixed brackets near the side of the slide valve and is in its center part formed as a spring $f^4$ so that it always tends to turn in a counter clockwise direction in Figs. 1, 3 and 4. This spring forms the returning means for the trip gear and is inclosed within the supporting bracket $e$. At the front end of the shaft $f$ there is arranged a stop drum $f'$ having a part thereof of greater diameter $f^2$. The part $f^2$ as can be seen in Fig. 3, extends forward for a greater distance than the part $f'$. On the part $f^2$ there is further another stop $f^3$ which projects beyond the part $f^2$. The stop part $f^3$ is arranged in the same plane as the bent round part of the plate $d$. It will be seen therefore that if the parts are in a position shown in Fig. 1 and the slide valve is raised, the inclined surface $d'$ will engage with the lefthand edge of the projection $f^3$ and rotate the shaft $f$ in a clockwise direction against the action of its spring. As soon however as the nose passes over the projection $f^3$ the shaft $f$ trips and the projection $f^3$ comes under the shoulder $d^2$. This is the position shown in Fig. 4 and in this position the opening $b^2$ of the valve registers with the opening $a^2$ of the supply pipe. Higher on the valve there is arranged a stop $g$ having an inclined part $g'$ and a horizontal part $g^2$. As can be seen in the plan view in Fig. 3 this horizontal part is adapted to project into the plane in which the projection or stop part $f^2$ carried by the shaft $f$ lies. To the shaft $f$ there is fixed a lever $h'$ which engages with the receptacle 6 illustrated in Fig. 5. The receptacle 6 is shaped so that when a certain quantity of the liquid is filled into it, the receptacle rotates about its point of suspension on the lever 7 through a short distance. This rotation continues until a stop 8 carried by the receptacle engages with a fixed stop 9. The rotation of the receptacle through the small angle causes the rotation of the lever $h'$ to the left in Fig. 4 and liberates the shoulder $d^2$ from engagement with the stop $f^3$. The valve $b$ now sinks by its weight, which forms the closing force, and this sinking continues until the shoulder $g^2$ comes against the stop $f^2$. In this position the opening of the valve is that indicated at $a^3$ in Fig. 4 by the dotted lines. The reduced quantity of liquid now passes to the receptacle till the exact weight has been filled in. When this exact weight is filled in the receptacle 6 sinks so that its pivot rests on the bracket 10 and thereby a stop 11 carried by the receptacle disengages the lever $h'$ so that the shaft $f$ trips back under the action of the spring into the position shown in Fig. 1. In this position the slide valve $b$ is entirely liberated and therefore closes the small opening $a^3$—that is to say comes into the position shown in Fig. 1.

In order to hold the valve parallel or exactly horizontal in the position shown in Fig. 4 and also to limit the extent of oscillation of the shaft $f$ a further shaft $k$ is supported in fixed bearings $i$ at the opposite side of the valve casing. The shaft $k$ is articulated to the shaft $f$ by means of a lever $h^2$, connecting rod $k'$ and lever $k^2$. The shaft $k$ may, if desired, be provided with a spring tending to rotate the same always in a counterclockwise direction, as described with reference to the shaft $f$. On the front end of the shaft $k$ there is arranged a drum having an eccentrically arranged part $m$ (see Figs. 1 and 4) adapted to engage with a fixed shoulder $m'$, when the shaft $f$ has swung into its extreme released position shown in Fig. 1. In this position the shoulder from the step $f^2$ to the part $f'$ is exactly vertical, as can be seen from the drawings. In addition to the eccentrically arranged part $m$ the shaft $k$ is provided as can be seen in Fig. 3, with a projecting part $m^2$ reaching into the same plane as the turned round part $o^2$ of the plate $o$ fixed to the slide valve in a similar manner to the plate $d$. The projection $m^2$ is adapted to engage with a shoulder formed on the bent round part $o'$, as can be seen most clearly in Fig. 4. In this way the righthand side of the slide valve $b$ is prevented from sinking lower than the lefthand side and the parallel opening $a^3$ is secured. It will be understood that when the lever $h'$ is released, the step from the projection $m^2$ is rotated into a vertical position so as to liberate the shoulder $o'$.

It will be understood that in order to prevent the slide valve jamming in its downward movement it is desirable to arrange the upper part of the valve motion as free as possible. To this end the valve is guided to travel in a vertical path by means of dovetail shears $b^4$ engaging in corresponding openings in the valve seat. The valve seat itself does not run exactly parallel to the bottom of the dovetailed groove in which the guide shears $b^4$ work, so that the upper part of the valve does not bear tightly on the valve seat as shown exaggerated in Fig. 2. By arranging the taper as desired the required pressure of the valve on its seat may be secured in the closed position.

It will be understood that the modification described above is only an illustration of one convenient method of constructing the regulating supply valve for liquid weighing machines according to the present invention.

I claim:—

1. In combination a rotatably mounted container adapted when partially full to rotate, a pivotally mounted lever carrying said container, a valve subjected to a closing force, trip gear holding said valve open against its closing force, and stops on the container coacting with said trip gear to partially release the same on rotation of the container and to completely release the same when said container sinks and the supporting lever oscillates.

2. In combination a liquid supply pipe, a controlling valve therefor subjected to a closing force, trip gear regulating the opening of said valve against its closing force, comprising a rotatable shaft carrying a plurality of stops, adapted by a partial rotation of the shaft to come successively into operation, a plurality of stops carried by the valve and coacting with said stops on the rotatable shaft in different positions of the travel of the valve under the action of its closing force.

3. In combination a supply pipe, a slide valve subjected to a closing force controlling the opening of said pipe, trip gear for holding said valve in different positions against its closing force, comprising a rotatable shaft supported at one side of said valve and in fixed bearing, a plurality of stops on said shaft, stops on the valve coacting with said stops on the shaft, a shaft arranged on the other side of said valve and having its rotation limited, and means for articulating said shafts to move together.

4. In combination a supply pipe opening onto a vertical face, a valve slidable vertically on said face under the action of its weight to close said pipe, stops carried by said valve, a trip gear for regulating the opening of said valve comprising shafts supported near the valve at each side and articulated to rotate together, stops carried by the shafts and coacting with the valve at each side to retain the same in a parallel opened position.

5. In combination a supply pipe, a slide valve controlling the outlet of said pipe and subjected to a closing force, stops carried by said valve in different planes and at different positions in the direction of motion of said valve, a movable member carrying stops adapted to coact successively with different stops on the valve so as to retain the same in position with different openings, said movable stops being arranged to pass entirely out of engagement with the valve for the purpose of enabling closing of the same.

6. In combination a supply pipe, a valve controlling the outlet of said pipe and subjected to a closing force, stops carried by said valve in different planes and at different positions in the direction of motion of said valve, a shaft supported near the side of said valve, stops carried by said shaft and coacting in different points in the rotation of the shaft with different stops on the slide valve, and in one position adapted to entirely release said slide valve, for the purpose set forth.

7. In combination, a liquid supply pipe opening onto a substantially vertical face forming a valve seat a slide valve movable over said seat, dove-tailed shear pieces on said valve for guiding the same in a fixed plane, said fixed plane being inclined slightly away from the valve seat in the opened position of the valve, and means for automatically holding said valve open in various positions as required against the action of a closing force.

In witness whereof I have hereunto set my hand in the presence of two witnesses.

HEINRICH WILHELM MEYER.

Witnesses:
HENRY HASPER,
ARTHUR SCHROEDER.